United States Patent
Atchley et al.

(10) Patent No.: US 10,360,533 B2
(45) Date of Patent: Jul. 23, 2019

(54) PRODUCT DISPLAY SURFACE APPARATUS AND METHOD

(71) Applicant: Walmart Apollo, LLC, Bentonville, AR (US)

(72) Inventors: Michael D. Atchley, Springdale, AR (US); John P. Thompson, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 122 days.

(21) Appl. No.: 15/608,042

(22) Filed: May 30, 2017

(65) Prior Publication Data
US 2017/0344937 A1 Nov. 30, 2017

Related U.S. Application Data

(60) Provisional application No. 62/342,488, filed on May 27, 2016.

(51) Int. Cl.
*G06K 7/10* (2006.01)
*G09F 3/20* (2006.01)
(Continued)

(52) U.S. Cl.
CPC .......... *G06Q 10/087* (2013.01); *G01G 19/42* (2013.01); *G01G 19/52* (2013.01);
(Continued)

(58) Field of Classification Search
CPC ...... G06Q 10/087; G01G 19/42; G01G 19/52; G06K 7/10009; G06K 19/0716; G06K 19/0723; H04W 4/30
(Continued)

(56) References Cited

U.S. PATENT DOCUMENTS 3,605,089 A * 9/1971 Gray ................. G01G 15/00
177/17
7,271,724 B2 9/2007 Goyal
(Continued)

FOREIGN PATENT DOCUMENTS

WO 2014188637 11/2014
WO 2014188653 11/2014
(Continued)

OTHER PUBLICATIONS

Hrebenciuc et al., A low Cost Approach to Large Smart Shelf Setups, 2011, Advances in Electrical and Computer Engineering, vol. 11, No. 4. (Year: 2011).*

*Primary Examiner* — Florian M Zeender
*Assistant Examiner* — Nicole Elena Bruner
(74) *Attorney, Agent, or Firm* — Fitch, Even, Tabin & Flannery, LLP

(57) ABSTRACT

A product display surface supports at least one product being offered for sale thereon. This product display surface has a weight-sensitive RFID tag associated therewith. This tag has at least one transmission element that moves with respect to a remaining portion of the tag as a function of weight being supported by the product display surface. So configured, the weight-sensitive RFID tag transmits at a first level when there are no products (or only a few products) on the product display surface and at a second level when there are at least a predetermined number of products on the product display surface, the first transmission level being less than the second transmission level. An RFID-tag reader reads the weight-sensitive RFID tag and a control circuit determines when the first product display surface lacks sufficient displayed inventory as a function, at least in part, of the weight-sensitive RFID tag's transmission strength.

14 Claims, 4 Drawing Sheets

(51) Int. Cl.
*H04W 4/20* (2018.01)
*H04W 4/30* (2018.01)
*G01G 19/42* (2006.01)
*G01G 19/52* (2006.01)
*G06K 19/07* (2006.01)
*G06Q 10/08* (2012.01)

(52) U.S. Cl.
CPC ..... *G06K 7/10009* (2013.01); *G06K 19/0716* (2013.01); *G06K 19/0723* (2013.01); *G09F 3/20* (2013.01); *H04W 4/20* (2013.01); *H04W 4/30* (2018.02)

(58) Field of Classification Search
USPC .......................................................... 705/28
See application file for complete search history.

(56) References Cited

U.S. PATENT DOCUMENTS

| | | | |
|---|---|---|---|
| 8,599,024 B2 | 12/2013 | Bloy | |
| 8,695,878 B2 | 4/2014 | Burnside | |
| 9,477,938 B1* | 10/2016 | Russell | G06Q 10/087 |
| 2006/0071774 A1* | 4/2006 | Brown | G06Q 10/087 |
| | | | 340/522 |
| 2006/0164247 A1* | 7/2006 | Overhultz | A47F 10/02 |
| | | | 340/572.1 |
| 2007/0250413 A1* | 10/2007 | Godlewski | G06Q 10/087 |
| | | | 705/28 |
| 2009/0222359 A1* | 9/2009 | Henry | G06Q 10/087 |
| | | | 705/28 |
| 2010/0007464 A1* | 1/2010 | McTigue | G06Q 10/087 |
| | | | 340/10.1 |
| 2013/0218511 A1* | 8/2013 | Mager | G01G 23/3735 |
| | | | 702/129 |
| 2014/0114708 A1* | 4/2014 | Campbell | G08B 5/22 |
| | | | 705/7.11 |
| 2015/0235066 A1 | 8/2015 | Hattori | |
| 2015/0304611 A1 | 10/2015 | Nakase | |
| 2017/0140333 A1* | 5/2017 | Rinzler | G06Q 10/087 |

FOREIGN PATENT DOCUMENTS

| | | |
|---|---|---|
| WO | 2015068316 | 5/2015 |
| WO | 2015133051 | 9/2015 |

* cited by examiner

PRODUCT DISPLAY SURFACE APPARATUS AND METHOD

RELATED APPLICATION

This application claims the benefit of U.S. Provisional Application No. 62/342,488, filed May 27, 2016, which is incorporated herein by reference in its entirety.

TECHNICAL FIELD

These teachings relate generally to product display surfaces.

BACKGROUND

Retail shopping facilities (i.e., so-called bricks-and-mortar facilities that accommodate physical visits by customers and where the customer views and physically selects desired products for retail purchase) have long utilized a variety of product display surfaces to present offered products. Examples of such surfaces include a variety of shelves made of a wide variety of materials including metals, wood, paperboard, plastics, and so forth.

Radio-frequency identification (RFID) tags are also known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. If and when all products in a retail shopping facility are each provided with a corresponding RFID tag that can uniquely identify their respective product, it may be possible to monitor displayed products in order to determine when, for example, a given product display surface is running low on inventory. That information could then be used to prompt replenishment of the product display surface.

Unfortunately, such is not presently the case. As a result, to some very large extent the replenishment of emptied product display surfaces may not occur in a timely manner. This situation is undesirable for both the consumer and the enterprise that operates the retail shopping facility.

BRIEF DESCRIPTION OF THE DRAWINGS

The above needs are at least partially met through provision of the product display surface apparatus and method described in the following detailed description, particularly when studied in conjunction with the drawings, wherein.

Figure 1:
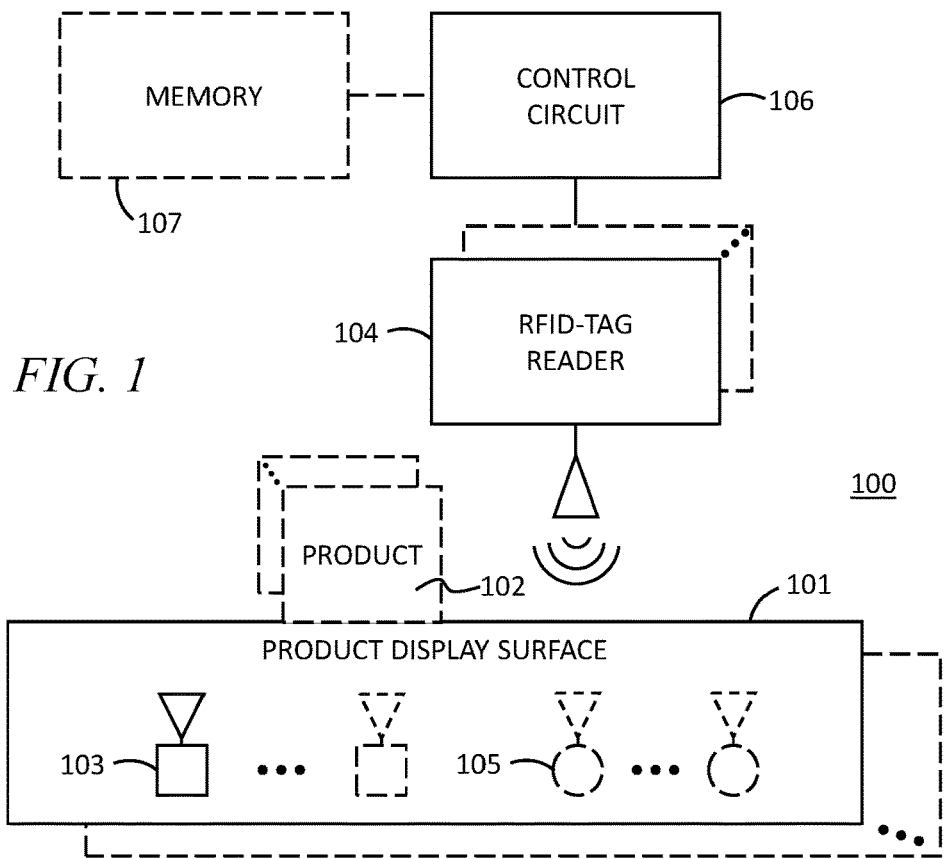
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments provide at least a first product display surface configured to support at least one product being offered for sale thereon. This product display surface has a weight-sensitive RFID tag associated therewith. This weight-sensitive RFID tag has at least one transmission element (such as all or part of an antenna) that moves with respect to a remaining portion of the weight-sensitive RFID tag as a function of varying weight being supported by the product display surface. So configured, the weight-sensitive RFID tag transmits at a first level when there are no products (or only a few products) on the product display surface and at a second level when there are at least a predetermined number of products on the product display surface, the first transmission level being less than the second transmission level. An RFID-tag reader reads the weight-sensitive RFID tag and a corresponding control circuit determines when the first product display surface lacks sufficient displayed inventory as a function, at least in part, of the weight-sensitive RFID tag's transmission strength.

By one approach the control circuit makes the foregoing determination as a function of the transmission strength for at least two of a plurality of such weight-sensitive RFID tags. By another approach the control circuit makes the foregoing determination as a function, at least in part, of the transmission strength for all of the plurality of weight-sensitive RFID tags that pertain to a particular product display surface.

These teachings are highly flexible in practice. By one approach, for example, the product display surface can further include at least one non-weight-sensitive RFID tag. For example, this non-weight-sensitive RFID tag may effectively transmit at a first level when there are no products on the product display surface and at a second effective level when there is at least one product on the product display surface within a predetermined distance of the non-weight-sensitive RFID tag, the first level being greater than the second level. This difference in received transmission strength can correspond, for example, to the blocking influence of one or more intervening products.

So configured, such an approach can help automatically detect when a particular product display surface requires replenishment. That information can be leveraged (either automatically or via one or more associates of the retail shopping facility) to task associates and/or automatons with replenishing the product display surface. Accordingly, these teachings can help ensure that products otherwise available in backroom inventory are generally also available for selection by consumers in a retail sales area.

These and other benefits may become clearer upon making a thorough review and study of the following detailed description. Referring now to the drawings, FIG. 1 presents an illustrative example of an enabling apparatus 100.

In this illustrative example the apparatus 100 includes at least one product display surface 101. This product display surface 101 serves to support at least one product 102 being offered for sale thereon. In a typical application setting this product display surface 101 will be disposed within a retail shopping facility (not shown). A retail shopping facility comprises a bricks-and-mortar (i.e., physical) facility in which products are physically displayed and offered for sale to customers who physically visit the facility. The shopping facility may include one or more of sales floor areas (where such a product display surface 101 will typically be located), checkout locations (i.e., point of sale (POS) locations), customer service areas other than checkout locations (such as service areas to handle returns), parking locations, entrance and exit areas, stock room areas, stock receiving areas, hallway areas, common areas shared by merchants, and so on. The facility may be any size or format of facility, and may include products from one or more merchants. For example, a facility may be a single store operated by one merchant or may be a collection of stores covering multiple merchants such as a mall.

These teachings will accommodate a wide variety of product display surfaces 101 including product display surfaces 101 that are comprised of only one component or that comprise a plurality of components. These teachings will also accommodate a wide variety of products 102 to be supported by such a product display surface 101.

The product display surface 101 includes a weight-sensitive RFID tag 103 associated therewith. This weight-sensitive RFID tag 103 has at least one transmission element that moves with respect to a remaining portion of the weight-sensitive RFID tag 103. More particularly, these portions of the weight-sensitive RFID tag 103 move as a function of varying weight being supported by the product display surface 101. More specifically, the weight-sensitive RFID tag 103 transmits at a first level when there are no products 102 on the product display surface 101 and at a second level when there are at least a predetermined number of products 102 on the product display surface 101. In a typical application setting the aforementioned first level is less than the aforementioned second level. By one approach the aforementioned first level may be 0 db.

One or more RFID-tag readers 104 are configured to read the one or more weight-sensitive RFID tags 103. RFID-tag readers comprise a well-understood area of prior art endeavor and require no further elaboration here. It will be noted, however, that these teachings will accommodate a variety of RFID-tag readers including fixed-location RFID-tag readers, handheld mobile RFID-tag readers, and RFID-tag readers that are moved about and/or operated by a corresponding autonomous mobile platform (either terrestrial or airborne).

Figure 2:
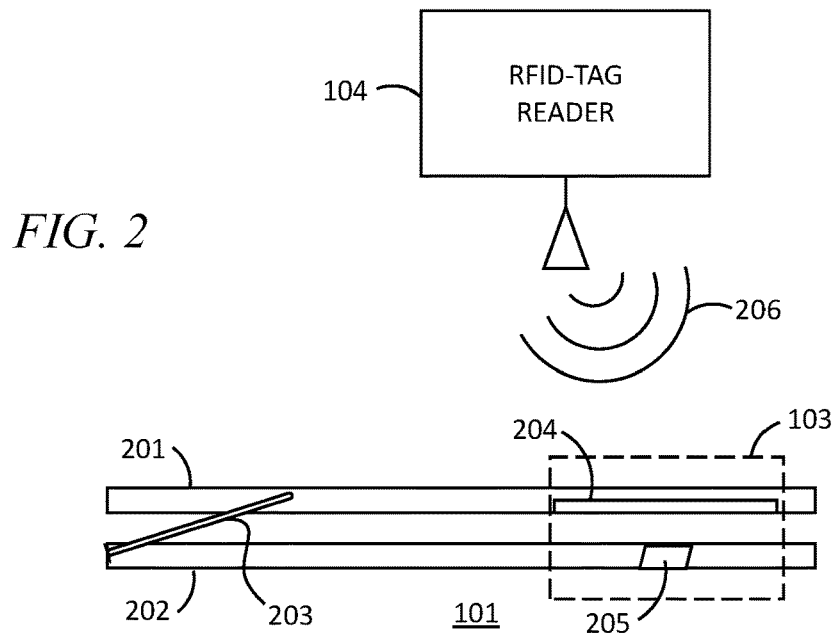
FIG. 2 comprises a side-elevational schematic view as configured in accordance with various embodiments of these teachings.
Figure 3:
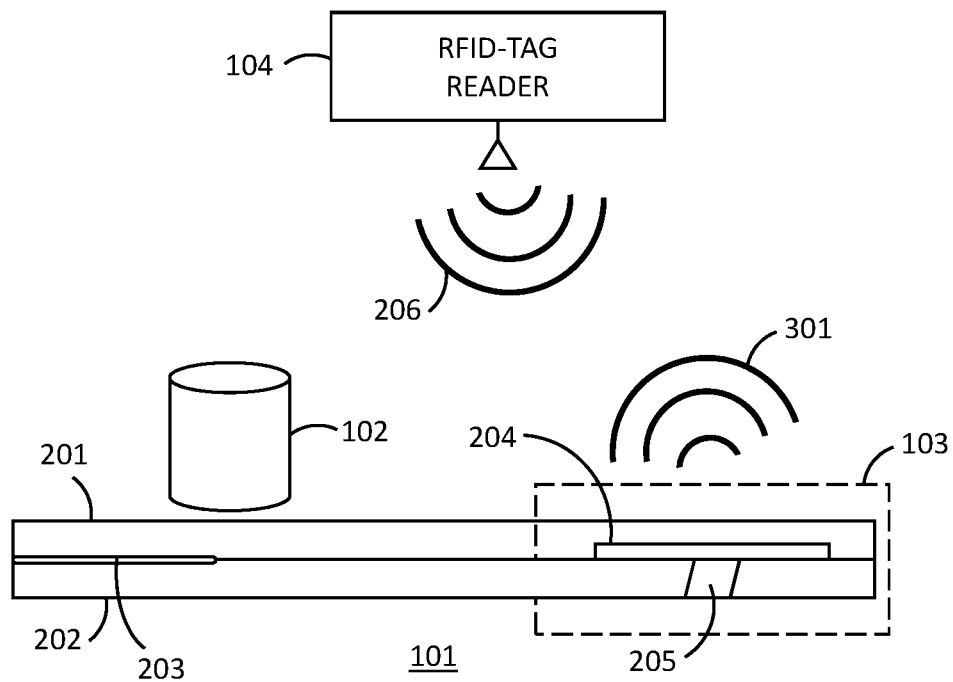
FIG. 3 comprises a side-elevational schematic view as configured in accordance with various embodiments of these teachings.

FIG. 2 presents a more specific example in these regards. In this example the product display surface 101 includes an upper component 201 and a lower component 202 that are physically separate from one another and that are capable of moving apart from one another during ordinary use. A connecting/bias assembly 203 (such as, for example a metal spring) tends to bias the upper and lower components 201 and 202 apart from one another. Referring momentarily to FIG. 3, the weight of an appropriate number of products 102 placed atop the upper component 201 will overcome the biasing force of the connecting/bias assembly 203 and, in this example, bring the upper component 201 into physical abutment with the lower component 202.

Referring again to FIG. 2, in this example the upper component 201 includes a transmission element (such as an antenna) for the weight-sensitive RFID tag 103 and the lower component 202 includes the remaining portion 205 of the weight-sensitive RFID tag 103. So configured, when the product display surface 101 does not support enough products 102 to overcome the biasing of the connecting/bias assembly 203, the transmission element 204 of the weight-sensitive RFID tag 103 is sufficiently distant from the remaining portion 205 of the weight-sensitive RFID tag 103 such that the weight-sensitive RFID tag 103 is nonresponsive to the read signals 206 transmitted by the RFID-tag reader 104.

Conversely, and referring again to FIG. 3, when a sufficient number of products 102 are supported by the product display surface 101 to overcome the biasing of the connecting/bias assembly 203, the transmission element 204 of the weight-sensitive RFID tag 103 is sufficiently proximal to the remaining portion 205 of the weight-sensitive RFID tag 103 such that the weight-sensitive RFID tag 103 responds in an ordinary manner to the read signals 206 of the RFID-tag reader 104 with its own transmitted response 301.

So configured, it can be seen that the transmission level by which the weight-sensitive RFID tag 103 responds to the read signals 206 of the RFID tag reader 104 will vary depending upon whether enough products 102 provide sufficient weight to bring the two components of the weight-sensitive RFID tag 103 closer to one another. These teachings will accommodate varying the bias strength of the connecting/bias assembly 203 in order to accommodate products 102 having particular weights and/or to design trigger points that correlate to a specific number of remaining products 102. For example, for some products it may be acceptable for only a single product 102 to overcome the bias strength of the connecting/bias assembly 203. In other cases, however, it may be useful for at least five products 102 to need to be on the product display surface 101 in order to overcome the bias strength of the connecting/bias assembly 203.

By one approach, and as described above, the separate transmission element 204 constitutes the only transmission element for the weight-sensitive RFID tag 103. By another approach, the separate transmission element 204 comprises a far-field transmission element while the remaining portion 205 of the weight-sensitive RFID tag 103 includes a near-field transmission element. So configured, the RFID-tag 103 may be able to respond to the read signal 206 of the RFID-tag reader 104 even when the two components 201 and 202 of the product display surface 101 are maximally apart from one another albeit with a low transmission level as compared to when the far-field transmission element is engaged and employed.

Figure 4:
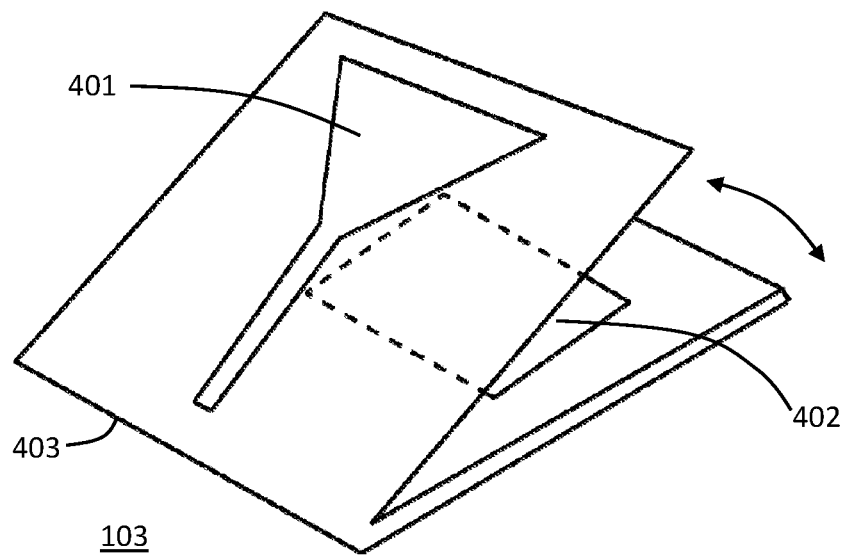
FIG. 4 comprises a perspective schematic view as configured in accordance with various embodiments of these teachings.

These teachings will readily accommodate other configurations for the weight-sensitive RFID tag 103. FIG. 4 presents one example in these regards. In this example, at least one transmission element 401 moves with respect to the remaining portion 402 of the weight-sensitive RFID tag 103 by pivoting (in this case about a hinge 403). Such a weight-sensitive RFID tag 103 may be disposed between two product display surface components 201 and 202 as described above and will operate in a generally similar manner. A supplemental biasing mechanism may be employed to urge the two components 201 and 202 ordinarily apart when the biasing capability of the pivoting weight-sensitive RFID tag 103 is itself insufficient in these regards.

Figure 5:
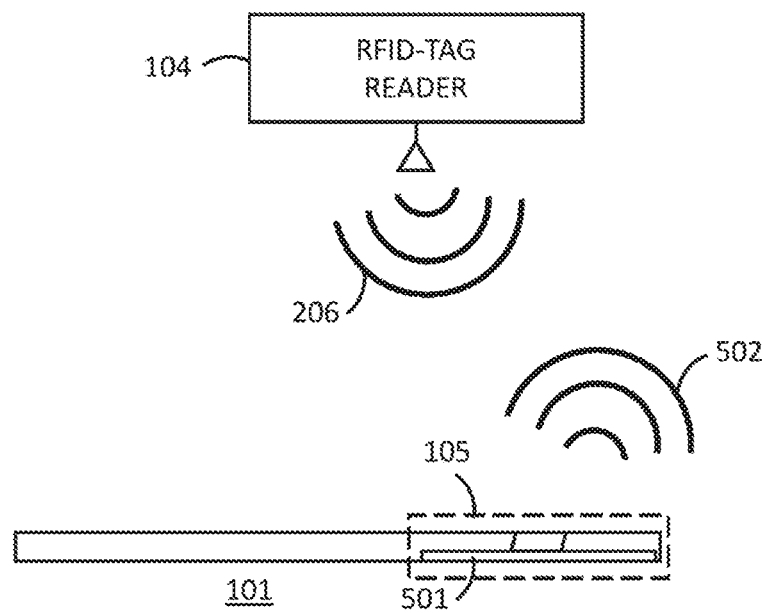
FIG. 5 comprises a side-elevational schematic view as configured in accordance with various embodiments of these teachings.
Figure 6:
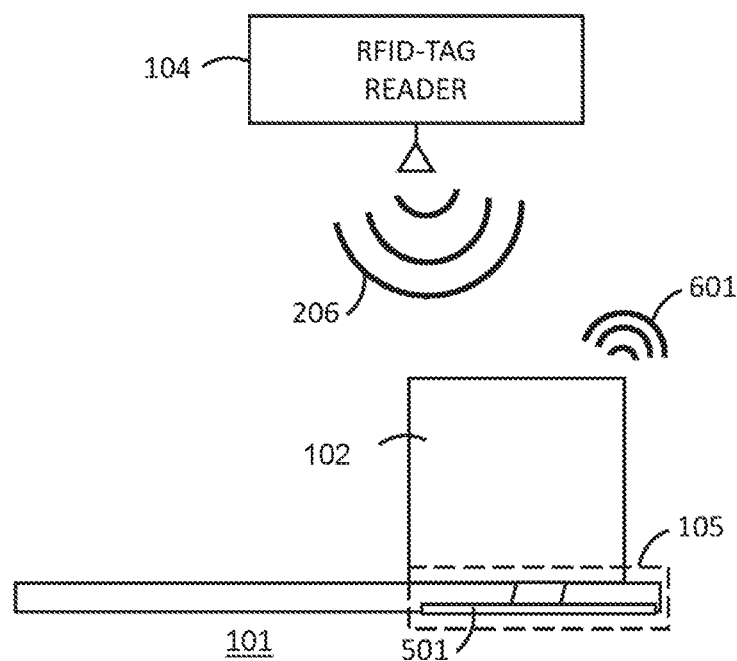
FIG. 6 comprises a side-elevational schematic view as configured in accordance with various embodiments of these teachings.

With continued reference to FIG. 1, these teachings will also readily accommodate having the product display surface 101 further include one or more non-weight-sensitive RFID tags 105. FIGS. 5 and 6 provide a more specific illustrative example in these regards. This non-weight-sensitive RFID tag 105 can be placed so that when there are no products overlying the transmission element 501 of the non-weight-sensitive RFID tag 105 the transmissions 502 of the non-weight-sensitive RFID tag 105 have a peak strength (as shown in FIG. 5). Conversely, when one or more products 102 overlie, in whole or in part, the transmission element 501 of the non-weight-sensitive RFID tag 105, the transmissions 601 of the non-weight-sensitive RFID tag 105 may have a reduced effective strength. (The level of attenuation due to the presence and proximity of the product 102 can vary with such things as the size, shape, and composition of the product 102 and its packaging. Foil packaging, for example, may attenuate the transmission of the non-weight-sensitive RFID tag 105 more significantly than cardboard packaging.) Supplementing the weight-sensitive RFID tags 103 with one or more non-weight-sensitive RFID tags 105 may be useful in some application settings to yield more useful and reliable results per the teachings set forth herein.

With continued reference to FIG. 1 the apparatus 100 can further include a control circuit 106 that operably couples to the aforementioned RFID-tag reader(s) 104. Being a "circuit," the control circuit 106 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 106 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 106 is configured (for example, by using corresponding programming as will be well understood by those skilled in the art) to carry out one or more of the steps, actions, and/or functions described herein.

By one optional approach the control circuit 106 operably couples to a memory 107. This memory 107 may be integral to the control circuit 106 or can be physically discrete (in whole or in part) from the control circuit 106 as desired. This memory 107 can also be local with respect to the control circuit 106 (where, for example, both share a common circuit board, chassis, power supply, and/or housing) or can be partially or wholly remote with respect to the control circuit 106 (where, for example, the memory 107 is physically located in another facility, metropolitan area, or even country as compared to the control circuit 106).

This memory 107 can serve, for example, to non-transitorily store the computer instructions that, when executed by the control circuit 106, cause the control circuit 106 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Figure 7:
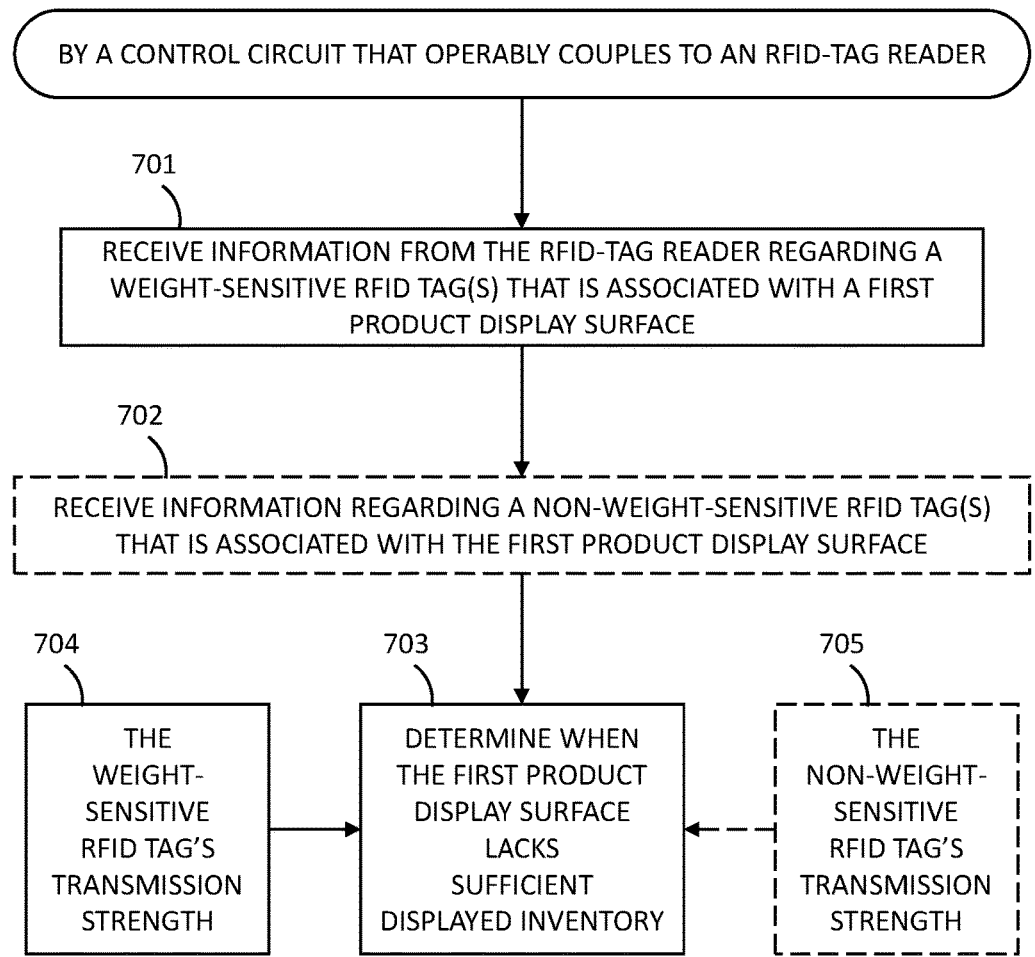
FIG. 7 comprises a flow diagram as configured in accordance with various embodiments of the invention.

FIG. 7 presents an illustrative process 700 that can be carried out, for example, by such a control circuit 106 in such an apparatus 100.

At block 701 of this process 700 the control circuit 106 receives (from the aforementioned RFID-tag reader(s) 104) information regarding at least one (and perhaps a plurality) of the aforementioned weight-sensitive RFID tags 103 that is associated with a first product display surface 101. This information can include, for example, identifying information for the weight-sensitive RFID tag 103 itself (to thereby also identify the corresponding product display surface 101) along with information regarding the transmission level(s) for this weight-sensitive RFID tag 103. The latter may be represented as desired, with information regarding the received signal strength indication (RSSI) of the received weight-sensitive RFID tag transmission(s) being a useful example for many purposes.

By one approach the provided information may comprise a single such reading for some discrete period of time (such as once per every five minutes) or may comprise a continuous series of such readings that are provided more or less in real time. Other possibilities may be employed if desired. For example, the RFID-tag reader 104 may be configured to provide information regarding an average received transmission level such that a single value represents the average of, say, one thousand sampled levels over some predetermined period of time.

At optional block 702 the control circuit 106 additionally receives information regarding one or more non-weight-sensitive RFID tags 105 that are also associated with the same product display surface 101. This information may also be pushed to the control circuit 106 by the RFID-tag reader 104 as the information becomes available or, if desired, may only be provided to the control circuit 106 when the latter interrogates the RFID-tag reader 104 for such information.

At block 703 the control circuit 106 then determines when the product display surface 101 lacks sufficient displayed inventory as a function, at least in part, of the weight-sensitive RFID tag's 103 transmission strength information 704 as optionally supplemented, if desired, by the transmission strength information 705 for the relevant non-weight-sensitive RFID tag's 105. This determination can comprise, for example, determining that the transmission strength of interest now exceeds (or is less then, as appropriate) a corresponding threshold level. For example, noting that a previously-detected transmission level for a weight-sensitive RFID tag 103 has dropped to or near zero can indicate that enough products have been removed from the monitored product display surface 101 to separate the transmission element from a remaining portion of the weight-sensitive RFID tag 103.

When the product display surface 101 includes a plurality of such tags (103, alone or in combination with one or more non-weight-sensitive RFID tags 105), the foregoing determination can include determining whether more than one of the relevant tags is similarly indicating that the product display surface 101 is becoming significantly depleted of product. For example, the control circuit 106 may not determine that the product display surface 101 lacks sufficient displayed inventory unless and until a predetermined number of such RFID tags all evidence such a circumstance via their respective received transmission levels. These teachings will even accommodate requiring that all RFID tags for a given product display surface 101 must have received transmission levels that evidence a requisite paucity of supported products.

These teachings are highly flexible in practice and will accommodate a variety of modifications if desired. As one example in these regards, the control circuit 106 can be configured to also receive information regarding a rate of sales for one or more of the products that are supported by a monitored product display surface 101. That rate of sales information might be gleaned, for example, from point-of-sales (POS) stations where stock keeping unit (SKU) information is tracked as various items are sold and removed from the retail shopping facility. Such information can serve as a parameter of interest that can dictate or trigger when the control circuit 106 employs the above-described process 700.

As another example, the control circuit 106 may be configured to work in combination with one or more of the RFID-tag readers 104 to base the aforementioned determinations, at least in part, upon interference patterns corresponding to the received transmissions of one or more of the RFID tags.

So configured, one or more product display surfaces in a given retail shopping facility can be automatically monitored to detect when the inventory of displayed products is running low and/or the surface is devoid of any such product. That determination can then be leveraged in any of a variety of ways. For example, a manager can be automatically notified (via, for example, an automatically-generated email, short message service (SMS) text message, or otherwise) of the detected circumstance. The manager can then task one or more associates to replenish the display as appropriate. As another example the control circuit 106 can be configured to itself automatically task associates with replenishing the relevant display area. And as yet another example, in lieu of the foregoing or in combination therewith, the control circuit 106 can be configured to automatically reorder the product that is running low or that is no longer available at the monitored display.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:
    at least a first product display surface configured to support at least one product being offered for sale thereon, the product display surface having:
        a weight-sensitive radio-frequency identification (RFID) tag associated therewith, the weight-sensitive RFID tag having at least one transmission element that moves with respect to a remaining portion of the weight-sensitive RFID tag as a function of varying weight being supported by the product display surface such that the weight-sensitive RFID tag transmits at a first signal strength level when there are no products on the product display surface and at a second signal strength level when there are at least a predetermined number of products on the product display surface, the first signal strength level being less than the second signal strength level; and
        a non-weight-sensitive RFID tag associated therewith, wherein the non-weight-sensitive RFID tag transmits at a peak strength level when there are no products on the product display surface and at attenuated reduced effective strength levels when there is at least one product on the product display surface within a predetermined distance of the non-weight-sensitive RFID tag;
    an RFID-tag reader configured to read the weight-sensitive RFID tag and the non-weight-sensitive RFID tag;
    a control circuit operably coupled to the RFID-tag reader and configured to determine when the first product display surface lacks sufficient displayed inventory as a function, at least in part, of the weight-sensitive RFID tag's transmission strength and the non-weight-sensitive RFID tag's transmission strength.

2. The apparatus of claim 1 wherein the first product display surface includes a plurality of the weight-sensitive RFID tags, and wherein the control circuit is configured to determine when the first product display surface lacks sufficient displayed inventory as a function, at least in part, of the transmission strength for at least two of the plurality of weight-sensitive RFID tags.

3. The apparatus of claim 1 wherein the at least one transmission element moves with respect to the remaining portion of the weight-sensitive RFID tag by pivoting.

4. The apparatus of claim 3 wherein the at least one transmission element pivots with respect to the remaining portion of the weight-sensitive RFID tag about a hinge.

5. The apparatus of claim 1 wherein the weight-sensitive RFID tag comprises at least a first and second physically separate parts.

6. The apparatus of claim 5 wherein the first physically separate part includes the at least one transmission element and the second physically separate part includes the remaining portion of the weight-sensitive RFID tag.

7. The apparatus of claim 1 wherein the RFID-tag reader comprises a fixed-location RFID-tag reader.

8. The apparatus of claim 1 wherein the RFID-tag reader comprises a mobile RFID-tag reader.

9. The apparatus of claim 8 wherein the mobile RFID-tag reader comprises an autonomous mobile platform.

10. The apparatus of claim 1 wherein the control circuit is further configured to:
    determine when to determine when the first product display surface lacks sufficient displayed inventory as a function, at least in part, of a predetermined parameter.

11. The apparatus of claim 10 wherein the predetermined parameter comprises information regarding a rate of sales for the at least one product.

12. A method comprising:
by a control circuit that operably couples to a radio-frequency identification (RFID)-tag reader:
receiving information from the RFID-tag reader regarding:
a weight-sensitive RFID tag that is associated with a first product display surface that is configured to support at least one product being offered for sale thereon, the weight-sensitive RFID tag having at least one transmission element that moves with respect to a remaining portion of the weight-sensitive RFID tag as a function of varying weight being supported by the product display surface such that the weight-sensitive RFID tag transmits at a first signal strength level when there are no products on the product display surface and at a second signal strength level when there are at least a predetermined number of products on the product display surface, the first signal strength level being less than the second signal strength level; and
a non-weight-sensitive RFID tag that is associated with the first product display surface, wherein the non-weight-sensitive RFID tag transmits at a peak strength level when there are no products on the product display surface and at attenuated reduced effective strength levels when there is at least one product on the product display surface within a predetermined distance of the non-weight-sensitive RFID tag;
determining when the first product display surface lacks sufficient displayed inventory as a function, at least in part, of the weight-sensitive RFID tag's transmission strength and the non-weight-sensitive RFID tag's transmission strength.

13. The method of claim 12 wherein receiving the information from the RFID-tag reader regarding the weight-sensitive RFID tag that is associated with the first product display surface comprises receiving information regarding a plurality of the weight-sensitive RFID tags that are associated with the first product display surface.

14. The method of claim 13 wherein determining when the first product display surface lacks sufficient displayed inventory comprises determining when the first product display surface lacks sufficient displayed inventory as a function, at least in part, of the transmission strength for all of the plurality of weight-sensitive RFID tags.

* * * * *